(12) United States Patent
Abdelmalek et al.

(10) Patent No.: US 11,444,987 B2
(45) Date of Patent: Sep. 13, 2022

(54) SYSTEMS AND METHODS FOR USER CAPABILITY EXCHANGE ACROSS NETWORKS

(71) Applicant: Verizon Patent and Licensing Inc., Arlington, VA (US)

(72) Inventors: Yousef Abdelmalek, New Providence, NJ (US); Hesham Elbatouti, Madison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/930,981

(22) Filed: May 13, 2020

(65) Prior Publication Data

US 2021/0360040 A1 Nov. 18, 2021

(51) Int. Cl.
*H04L 65/1104* (2022.01)
*H04L 65/1069* (2022.01)
*H04L 65/1016* (2022.01)

(52) U.S. Cl.
CPC ...... *H04L 65/1104* (2022.05); *H04L 65/1016* (2013.01); *H04L 65/1069* (2013.01)

(58) Field of Classification Search
CPC ............. H04L 65/1006; H04L 65/1016; H04L 65/1069; H04L 29/06; H04L 29/0602; H04L 29/06027; H04L 29/06034; H04L 29/06176; H04L 29/0653; H04L 29/06537; H04L 29/08072; H04L 41/0896; H04L 43/00; H04L 69/329; H04L 47/12; H04L 49/90; H04L 63/029; H04L 63/20; H04L 67/10; H04L 67/42; H04L 12/28; H04L 12/4633; H04L 12/66; H04L 29/12311; H04L 41/00; H04L 41/0213; H04L 41/12; H04L 41/145; H04L 41/147; H04L 41/5025; H04L 45/00; H04L 45/50; H04L 45/54; H04L 47/10; H04L 47/125; H04L 47/15; H04L 47/193; H04L 47/2416; H04L 47/2441; H04L 47/32; H04L 47/70; H04L 47/724; H04L 47/762; H04L 47/822; H04L 47/829; H04L 61/10; H04L 61/2061; H04L 61/2084; H04L 61/2592; H04L 63/02; H04L 63/0236; H04L 63/0272;
(Continued)

(56) References Cited

U.S. PATENT DOCUMENTS 9,585,018 B2 * 2/2017 Piscopo, Jr. ...... H04W 12/0808
10,375,103 B1 * 8/2019 Brandwine ......... H04L 63/0236
(Continued)

*Primary Examiner* — Greg C Bengzon

(57) ABSTRACT

A session border manager (SBM) may receive a session initiation protocol (SIP) request for a session or a service involving a first user equipment (UE) that is subscribed to a first network and a second UE, that is subscribed to a second network, wherein the SIP request indicates a service type of the session or the service. The SBM may determine, based on the service type, a subnetwork of the second network that is to facilitate the session or the service, wherein the subnetwork is one subnetwork, of a plurality of subnetworks, of the second network that is designated to manage communications that are associated with the service type. The SBM may transmit the SIP request to the subnetwork to cause the subnetwork to initiate the session or the service with the second UE. The SBM may receive, from the subnetwork, a response to the SIP request.

20 Claims, 10 Drawing Sheets

(58) Field of Classification Search
CPC . H04L 63/04; H04L 63/0428; H04L 63/0876; H04L 63/101; H04L 63/1433; H04L 63/166; H04L 65/605; H04L 67/143; H04L 67/2823; H04L 67/306; H04L 69/08; H04L 69/24; H04L 69/32; H04L 69/325; H04L 45/24; H04L 45/48; H04L 61/103; H04L 63/0209; H04L 63/08; H04L 63/0853; H04L 63/10; H04L 63/107; H04L 67/141; H04L 67/18; H04L 67/32; H04L 67/327; H04M 3/4228; H04M 3/4217; H04M 3/42289; H04M 3/42365; H04M 3/42374; H04M 7/0051; H04M 7/0066; H04M 7/0069; H04M 7/0075; H04M 7/0081; H04M 7/0087; H04M 7/0093; H04W 48/18; H04W 8/26; H04W 28/24; H04W 36/14; H04W 40/248; H04W 48/20; H04W 72/04; H04W 76/22; H04W 80/04; H04W 88/16; H04W 8/087; H04W 12/0609; H04W 48/00; H04W 48/16; H04W 48/17; H04W 60/04; H04W 68/12; H04W 76/10; H04W 76/11; H04W 76/12; H04W 76/15; H04W 76/16; H04W 8/08; H04W 8/183; H04W 80/10; H04W 88/10; H04W 88/12; H04W 88/14; H04W 12/001; H04W 12/004; H04W 12/00514; H04W 12/04031; H04W 12/04033; H04W 12/10; H04W 24/02; H04W 4/12; H04W 4/50; H04W 60/005; H04W 84/042; H04W 84/12; H04W 8/205; H04Q 3/0016; H04Q 3/0025; H04Q 3/0033; H04Q 3/0037; H04Q 3/0041; H04Q 3/0045; H04Q 3/0054; H04Q 3/0058; H04Q 3/0095

See application file for complete search history.

(56) References Cited

U.S. PATENT DOCUMENTS

| | | | | |
|---|---|---|---|---|
| 10,567,952 B1* | 2/2020 | Finger | H04W 8/183 |
| 10,728,836 B2* | 7/2020 | Jung | H04W 12/08 |
| 2004/0243680 A1* | 12/2004 | Mayer | H04L 65/1073 | 709/206 |
| 2006/0146792 A1* | 7/2006 | Ramachandran | H04L 45/3065 | 370/352 |
| 2006/0183491 A1* | 8/2006 | Gundu | H04W 4/10 | 455/518 |
| 2007/0071221 A1* | 3/2007 | Allen | H04L 61/157 | 379/265.01 |
| 2008/0261593 A1* | 10/2008 | Wong | H04W 72/048 | 455/435.1 |
| 2009/0185557 A1* | 7/2009 | Song | H04L 65/1069 | 370/352 |
| 2009/0296566 A1* | 12/2009 | Yasrebi | H04L 65/1043 | 370/221 |
| 2009/0296567 A1* | 12/2009 | Yasrebi | H04L 41/0813 | 370/221 |
| 2010/0017861 A1* | 1/2010 | Krishnaswamy | H04L 29/06 | 726/7 |
| 2010/0122281 A1* | 5/2010 | Wang | H04L 63/10 | 725/25 |
| 2010/0185774 A1* | 7/2010 | van Elburg | H04L 67/14 | 709/228 |
| 2011/0069661 A1* | 3/2011 | Waytena, Jr. | H04W 12/0804 | 370/328 |
| 2011/0072141 A1* | 3/2011 | Veenstra | H04L 65/1069 | 709/228 |
| 2011/0113141 A1* | 5/2011 | Veenstra | H04L 63/20 | 709/226 |
| 2011/0134843 A1* | 6/2011 | Noldus | H04L 65/1073 | 370/328 |
| 2011/0310864 A1* | 12/2011 | Gage | H04L 45/02 | 370/338 |
| 2012/0020252 A1* | 1/2012 | Bouthemy | H04L 12/66 | 370/259 |
| 2012/0127895 A1* | 5/2012 | Yussouff | H04L 67/34 | 370/259 |
| 2012/0163204 A1* | 6/2012 | Oprescu-Surcobe | H04W 76/45 | 370/254 |
| 2012/0169825 A1* | 7/2012 | Patel | H04L 65/1089 | 348/14.01 |
| 2012/0214480 A1* | 8/2012 | Ionescu | H04L 65/1016 | 455/425 |
| 2012/0302233 A1* | 11/2012 | Moermans | H04L 67/306 | 455/432.3 |
| 2013/0103834 A1* | 4/2013 | Dzerve | H04L 61/2557 | 709/225 |
| 2014/0344913 A1* | 11/2014 | Stahl | H04L 65/1006 | 726/11 |
| 2014/0372557 A1* | 12/2014 | Buckley | H04L 65/1006 | 709/217 |
| 2015/0074741 A1* | 3/2015 | Janakiraman | H04L 63/101 | 726/1 |
| 2015/0110035 A1* | 4/2015 | Lee | H04L 63/205 | 370/329 |
| 2015/0271662 A1* | 9/2015 | Lhamon | H04W 8/183 | 370/329 |
| 2015/0281966 A1* | 10/2015 | Griot | H04W 12/06 | 726/5 |
| 2015/0282042 A1* | 10/2015 | Griot | H04W 12/06 | 370/329 |
| 2015/0319603 A1* | 11/2015 | Faller | H04W 12/06 | 455/432.1 |
| 2016/0021146 A1* | 1/2016 | Mufti | H04L 65/1073 | 370/328 |
| 2016/0057725 A1* | 2/2016 | Suh | G06Q 50/30 | 455/435.1 |
| 2016/0156783 A1* | 6/2016 | Mufti | H04L 65/1073 | 455/445 |
| 2016/0212177 A1* | 7/2016 | Xu | H04L 65/40 |
| 2017/0048251 A1* | 2/2017 | Guday | H04L 67/303 |
| 2017/0317919 A1* | 11/2017 | Fernando | H04L 41/0806 |
| 2018/0139601 A1* | 5/2018 | Dowlatkhah | H04W 8/18 |
| 2018/0270363 A1* | 9/2018 | Guday | H04M 15/8214 |
| 2018/0278698 A1* | 9/2018 | Joseph | H04W 92/02 |
| 2018/0309671 A1* | 10/2018 | Scott | H04W 84/042 |
| 2018/0376412 A1* | 12/2018 | Bischinger | H04W 8/08 |
| 2019/0007368 A1* | 1/2019 | Hooda | H04L 61/2015 |
| 2019/0014470 A1* | 1/2019 | Bischinger | H04L 63/0876 |
| 2019/0028991 A1* | 1/2019 | Breitbach | H04W 24/02 |
| 2019/0098103 A1* | 3/2019 | El-Gawady | H04L 65/1016 |
| 2019/0124043 A1* | 4/2019 | Xu | H04L 65/102 |
| 2019/0124616 A1* | 4/2019 | Khan | H04W 12/06 |
| 2019/0159016 A1* | 5/2019 | Zhang | H04L 63/0281 |
| 2019/0281506 A1* | 9/2019 | Chiang | H04W 12/00512 |
| 2019/0335534 A1* | 10/2019 | Atari | H04W 80/10 |
| 2019/0356617 A1* | 11/2019 | Synal | H04L 65/1066 |
| 2020/0008049 A1* | 1/2020 | Namiranian | H04W 12/001 |
| 2020/0050439 A1* | 2/2020 | Bjordal | H04W 8/183 |
| 2020/0112854 A1* | 4/2020 | Namiranian | G06K 7/1417 |
| 2020/0145465 A1* | 5/2020 | Al-Mehdar | H04L 51/226 |
| 2020/0177638 A1* | 6/2020 | Salman | H04L 41/0893 |
| 2020/0186574 A1* | 6/2020 | Amin | H04L 65/1073 |
| 2020/0314924 A1* | 10/2020 | Bischinger | H04W 12/0609 |
| 2020/0396262 A1* | 12/2020 | Al-Mehdar | H04L 61/503 |
| 2022/0021712 A1* | 1/2022 | Foti | H04L 65/1036 |

* cited by examiner

SYSTEMS AND METHODS FOR USER CAPABILITY EXCHANGE ACROSS NETWORKS

BACKGROUND

Devices that communicate using session initiation protocol (SIP), sometimes referred to as SIP user agents, can support (or lack support for) a wide variety of capabilities. To assist with effective communication, SIP user agents may exchange capability information for a session. This capability information may be indicated in, for example, a SIP header, a contact header (e.g., within a SIP register message, a SIP options message, or a SIP invite message, among other examples), or a similar field of a SIP message.

DETAILED DESCRIPTION OF PREFERRED EMBODIMENTS

Figure 1A:
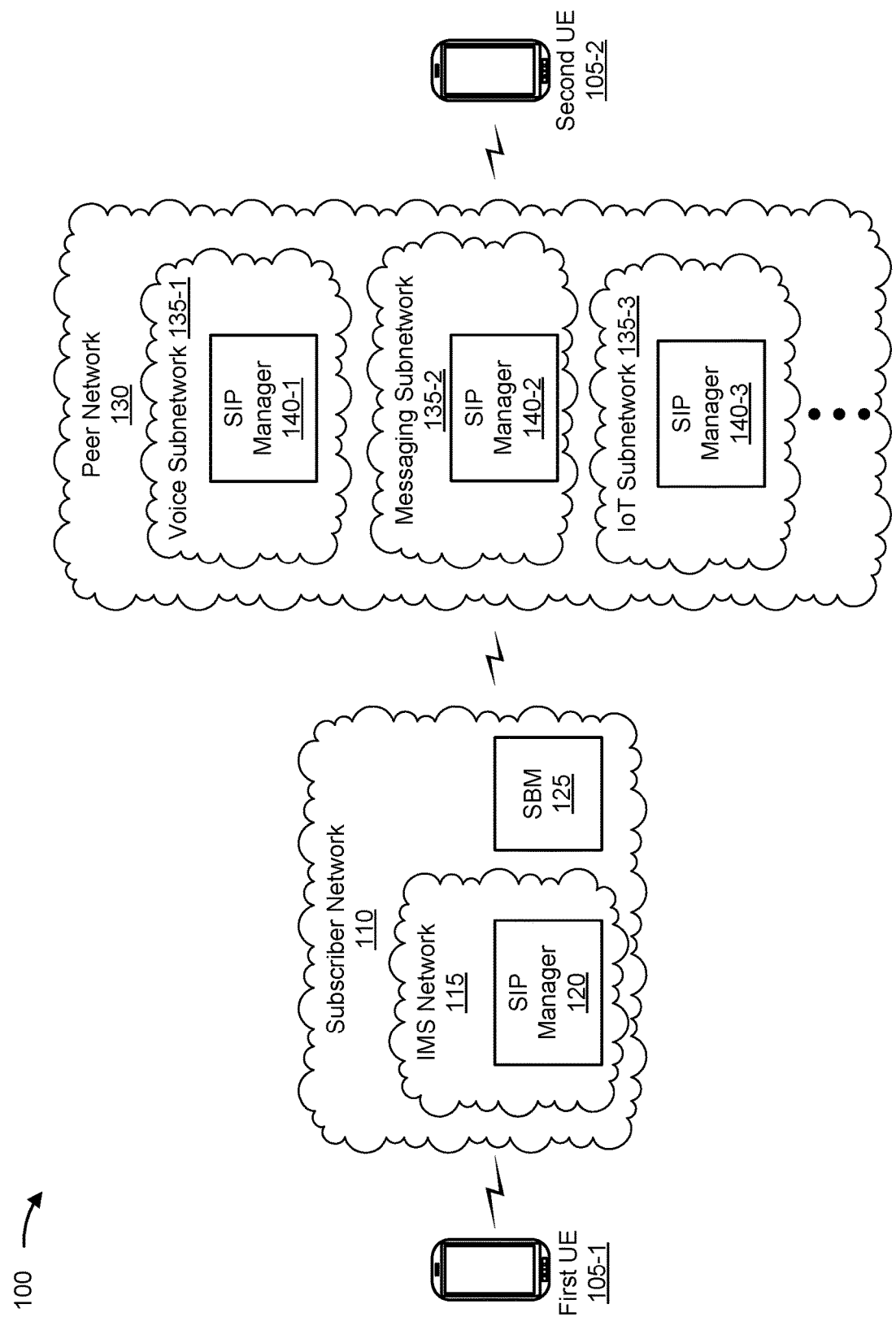
FIGS. 1A-1E are diagrams of an example implementation described herein.

The following detailed description of example implementations refers to the accompanying drawings. The same reference numbers in different drawings may identify the same or similar elements.

In a core network of a mobile network operator (MNO), an Internet Protocol (IP) Multimedia Subsystem (IMS) may be used to deliver IP multimedia services to or between user equipment. In some cases, communications handled by an IMS network (sometimes called an IMS core) may use SIP, which is a signaling protocol for initiating, maintaining, and terminating real-time sessions for media services, such as voice services, video services, messaging services, and/or the like. Some MNOs may use a core network that has a single IMS core (e.g., a single subnetwork within the core network) to handle multiple types of services (e.g., SIP services), such as voice services, video services, messaging services, Internet of Things (IoT) services, virtual reality services, augmented reality services, and/or the like. Other MNOs may use a core network that has multiple IMS cores (e.g., multiple, separate subnetworks of the core network), and each IMS core may handle a different type of SIP service or a different subset of SIP services.

When communicating using SIP, two user equipment (UEs) may exchange capability information via a user capability exchange (UCE) procedure. If a core network includes separate IMS cores or subnetworks to handle different types of SIP services, a session border controller (SBC) that processes messages transferred between core networks (e.g., of different MNOs) may need to send multiple UCE messages to the core network, such as one for each IMS subnetwork that handles SIP messages. For example, an SBC of a first core network associated with a first UE of a SIP session may need to send a UCE message from the first UE to each of the IMS subnetworks of a second core network associated with a second UE of the SIP session, regardless of the service type of the SIP session. The second UE may receive a request for its capabilities from each of the IMS subnetworks, and may respond to those requests. The SBC may receive responses from each of the IMS subnetworks, and may then establish a connection with the IMS subnetwork that handles the particular type of service associated with the SIP session based on the responses from the second UE (e.g., indicating which service types the second UE supports).

The transmission, reception, routing, and processing of multiple messages associated with a user capability exchange (e.g., UCE messages) wastes resources of multiple devices (e.g., the SBC, the second UE, and devices of the IMS subnetworks, among other examples), such as memory resources, processing resources, and/or the like. Furthermore, the transmission, reception, routing, and processing of multiple messages associated with a user capability exchange wastes network resources (e.g., bandwidth, time resources, frequency resources in the case of over-the-air communications, and/or the like), which may increase latency for other communications and may reduce network performance. Some implementations described herein enable reduction in the quantity of messages transmitted, received, routed, and/or processed in association with a user capability exchange, such as transmission of one or more UCE messages to fewer than all of the IMS subnetworks. In some cases, implementations described herein may enable an SBC to transmit a single UCE message to a single IMS subnetwork, which then results in a single UCE response message that needs to be processed by the SBC. As a result, resources may be conserved for the SBC, the core network with multiple IMS subnetworks, the second UE, and/or the like. Furthermore, network resources may be conserved.

FIGS. 1A-1E are diagrams of an example 100 associated with user capability exchange across networks. As shown in FIGS. 1A-1E, example 100 includes a first UE 105-1; a second UE 105-2; a subscriber network 110 (e.g., a core network of an MNO with which the first UE 105-1 has a subscription) that includes an IMS network 115, a SIP manager 120 (e.g., for the IMS network 115), and a session border manager (SBM) 125; a peer network 130 (e.g., a core network of an MNO with which the second UE 105-2 has a subscription) that includes multiple IMS networks 135 and multiple SIP managers 140 corresponding to the multiple IMS networks 135.

As shown in FIG. 1A, the subscriber network 110 (sometimes referred to herein as a first network) may include a single IMS network 115 (e.g., a single subnetwork within the core network) to handle multiple types of services (e.g., SIP services), such as voice services, video services, messaging services, IoT services, virtual reality services, augmented reality services, and/or the like. The IMS network 115 may include one or more devices, shown as a SIP manager 120, to handle the multiple types of services. The SIP manager may include a call session control function (CSCF) device and/or may determine that a communication from the first UE 105-1 (e.g., a UCE message) is destined for a second UE 105-2 that does not have a subscription for the subscriber network 110 (e.g., is subscribed to an MNO associated with the peer network 130). The SBM 125 may include, for example, a session border controller (SBC) and one or more electronic numbering (ENUM) data structures. As described in more detail below, an ENUM data structure may map SIP service types to corresponding IMS networks 135. Although the SBM 125 is shown as being included in the subscriber network 110, the SBM 125 may additionally or alternatively be included in the peer network 130.

The peer network 130 (sometimes referred to herein as a second network) may be associated with (e.g., may be owned and/or operated by) a different MNO than the subscriber network 110. As shown, the peer network 130 may include multiple IMS networks 135 (e.g., multiple subnetworks within the core network) that each handle one or more types of services (e.g., SIP services). In example 100, a first IMS network, shown as a voice subnetwork 135-1, handles SIP voice calls; a second IMS network, shown as a messaging subnetwork 135-2, handles SIP messaging; and a third IMS network, shown as an IoT subnetwork 135-3, handles SIP IoT messaging. These IMS networks and the types of services that these IMS networks handle are shown as examples. Other example SIP services include messaging services, virtual reality services, augmented reality services, vehicle-to-everything (V2X) services, and/or the like. In some implementations, a single IMS network 135 (of the multiple IMS networks 135 included in the peer network 130) may handle more than one type of SIP service. For example, the voice subnetwork 135-1 may handle voice calls and video calls. As shown, each IMS network 135 may include a respective SIP manager 140 to handle the service types for that IMS network 135.

In some implementations, a SIP session may originate from the first UE 105-1 and may terminate at the second UE 105-2. In this case, the first UE 105-1 may be referred to as an originating UE or a mobile originating device, and the second UE 105-2 may be referred to as a terminating UE or a mobile terminating device. As described in more detail below, some implementations described herein enable the SBM 125 to reduce a quantity of messages transmitted, received, routed, and processed in association with a user capability exchange between the first UE 105-1 and the second UE 105-2, such as by transmitting one or more UCE messages to fewer than all of the IMS subnetworks 135. In some cases, implementations described herein may enable the SBM 125 to transmit a single UCE message to a single IMS network 135 of the peer network 130, which then results in a single UCE response message that needs to be processed by the SBM 125. As a result, resources may be conserved for the SBM 125, the peer network 130, the second UE 105-2, and/or the like.

Figure 1B:
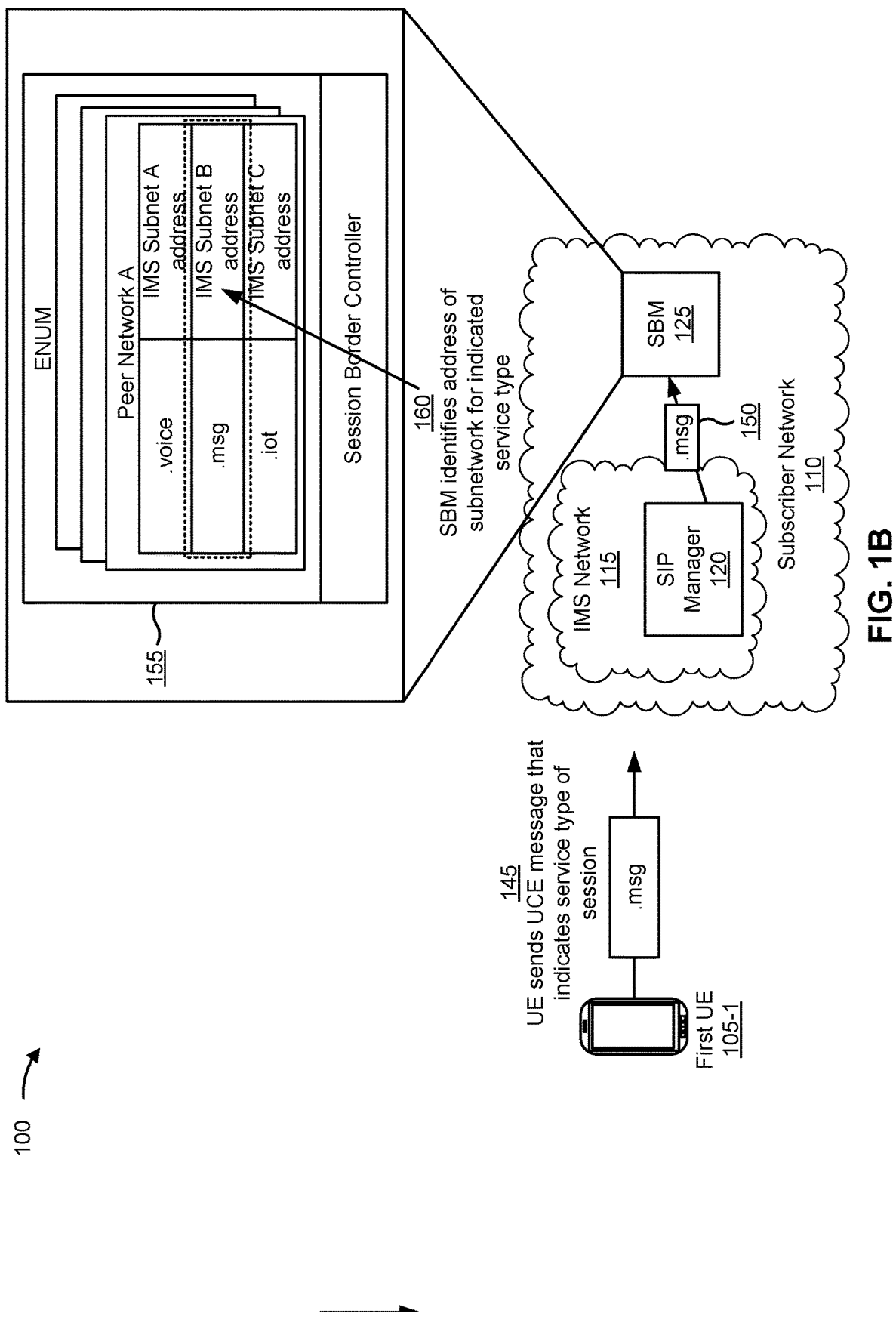

As shown in FIG. 1B, and by reference number 145, the first UE 105-1 may transmit a message to initiate a user capability exchange (shown as a UCE message) for a session (e.g., a communication session) to be established between the first UE 105-1 and the second UE 105-2. The message may include, for example, a SIP message (e.g., a SIP request), such as a SIP subscribe message (e.g., a SIP subscribe request for presence-based UCE awareness), a SIP register message, a SIP options message (e.g., a SIP options request for options-based UCE awareness), a SIP invite message, and/or the like. In this case, the message may be associated with initiating or establishing a SIP session with the second UE 105-2 and/or may be associated with a user capability exchange request to establish the session. The message may indicate (e.g., explicitly or implicitly) a service type associated with the session (e.g., a SIP service type, an IMS service type, and/or the like). The service type may include, for example, a voice call service type, a video call service type, a messaging service type, an IoT service type, a media service type, a virtual reality (VR) service type, an augmented reality (AR) service type, an extended reality (XR) service type, and/or the like. In example 100, the message indicates that the session is associated with a messaging service type (shown as ".msg").

The first UE 105-1 (and/or one or more applications installed on and/or executing on the first UE 105-1) may be configured to indicate the service type in the message. In some implementations, the first UE 105-1 indicates the service type in a header of the message, such as a contact header of a SIP message. For example, the first UE 105-1 may indicate the service type by using a particular format for the contact header, by including a particular value (e.g., a string, among other examples) in the contact header, and/or the like. Additionally, or alternatively, the first UE 105-1 may indicate the service type in an accept contact header of the SIP message. In some implementations, an application installed on and/or executing on the first UE 105-1 may be configured to indicate, in the message, only the service type(s) that are needed for the communication session with the second UE 105-2. In some implementations, the first UE 105-1 and/or the application may indicate the service type using a fully qualified domain name (FQDN). Additionally, or alternatively, the first UE 105-1 and/or the application may include an application identifier, that identifies the application, in the message, and the service type may be determined based on the application identifier.

In some implementations, the first UE 105-1 may identify an application for which a SIP session is to be established (e.g., with a second UE 105-2). The first UE 105-1 may determine a SIP service type associated with the application, which may be based on the application, an application type of the application, a service type being requested by the application, and/or the like. The first UE 105-1 may generate a SIP message to include an indication of the service type. The first UE 105-1 may transmit the SIP message to a core network (e.g., via a base station or a radio access network), such as the subscriber network 110. The subscriber network 110 may route the message through the IMS network 115 and the SIP manager 120. The SIP manager 120 may determine that the SIP message is intended for a UE that is not subscribed to the subscriber network 110 (e.g., is subscribed to a core network other than the subscriber network 110, such as the peer network 130). Based on this determination, the SIP manager 120 may transmit the message to the SBM 125, as shown by reference number 150.

Because the message indicates the service type, the SBM 125 may transmit (e.g., route) the message to a specific IMS network 135 of the peer network 130, rather than transmitting the message to all IMS networks 135 of the peer network 130. The SBM 125 may identify an IMS network 135 associated with the service type (e.g., responsible for handling communication sessions associated with the service type), and may transmit the message to the identified IMS network 135. In some implementations, the SBM 125 may extract a service type identifier, that identifies the service type, from the message (e.g., from a header of a SIP request, such as a contact header) and may identify an IMS subnetwork responsible for managing a session associated with the service type based on information stored by the SBM 125. Additionally, or alternatively, the SBM 125 may determine the service type based on an application indicated in the message (e.g., using an application identifier). For example, the message may include an application identifier that identifies a voice call application, and the SBM 125 may determine a voice call service type based on that application identifier.

As shown by reference number 155, the SBM 125 may store an ENUM data structure, for one or more peer networks, that maps service types to IMS subnetwork addresses. An ENUM data structure for a peer network may identify, for that peer network, a set of IMS subnetworks included in the peer network and a corresponding set of service types handled by those IMS subnetworks. In some implementations, the ENUM data structure may include a network address associated with an IMS subnetwork (e.g., an address of a SIP manager of the IMS subnetwork) so that the SBM 125 can transmit traffic to that network address. The network address may identify a device associated with the IMS subnetwork, such as a SIP manager, a gateway associated with the IMS subnetwork, an interconnection border control function (IBCF) gateway associated with the IMS subnetwork, and/or the like.

In example 100, the ENUM data structure for a first peer network (shown as Peer Network A) indicates a network address for a first IMS subnetwork of the peer network (shown as IMS Subnet A address) and a first service type handled by the first IMS subnetwork (shown as a voice service type), indicates a network address for a second IMS subnetwork of the peer network (shown as IMS Subnet B address) and a second service type handled by the second IMS subnetwork (shown as a messaging service type), and indicates a network address for a third IMS subnetwork of the peer network (shown as IMS Subnet C address) and a third service type handled by the third IMS subnetwork (shown as an IoT service type).

As shown by reference number 160, because the service type in example 100 is a messaging service type, the SBM 125 identifies the second IMS subnetwork 135 of the peer network 130. For example, the SBM 125 may perform a data structure lookup, based on the service type, to identify a corresponding IMS subnetwork for handling and/or facilitating a session associated with the service type (e.g., an IMS subnetwork capable of processing and/or designated for managing network traffic for a session associated with the service type). In some implementations, the SBM 125 may store one or more ENUM data structures associated with multiple peer networks. In this case, the SBM 125 may identify an address to use for forwarding the UCE message based on the service type and based on a peer network to which the UCE message is to be forwarded (e.g., a peer network associated with the second UE 105-2). In some implementations, different SBMs 125 may be used as gateways to different peer networks, and each SBM 125 may store an ENUM data structure for a single peer network. In this case, the SIP manager 120 may identify an SBM 125, to which the message is to be transmitted, based on a peer network to which the UCE message is to be forwarded. The SBM 125 may then identify a network address of an IMS subnetwork of the peer network based on the service type.

Although the SBM 125 is shown as being included in the subscriber network 110, the SBM 125 may additionally or alternatively be included in the peer network 130. In this case, a session border controller of the subscriber network 110 may transmit the UCE message to the SBM 125 included in the peer network 130. The SBM 125 in the peer network 130 may perform the operations described above to identify an IMS subnetwork to which the UCE message is to be transmitted, and may transmit the UCE message to the identified IMS subnetwork. In this way, details of the IMS subnetworks, architectures, and/or devices of the peer network 130 may be kept internal to and private to the peer network 130.

Figure 1C:
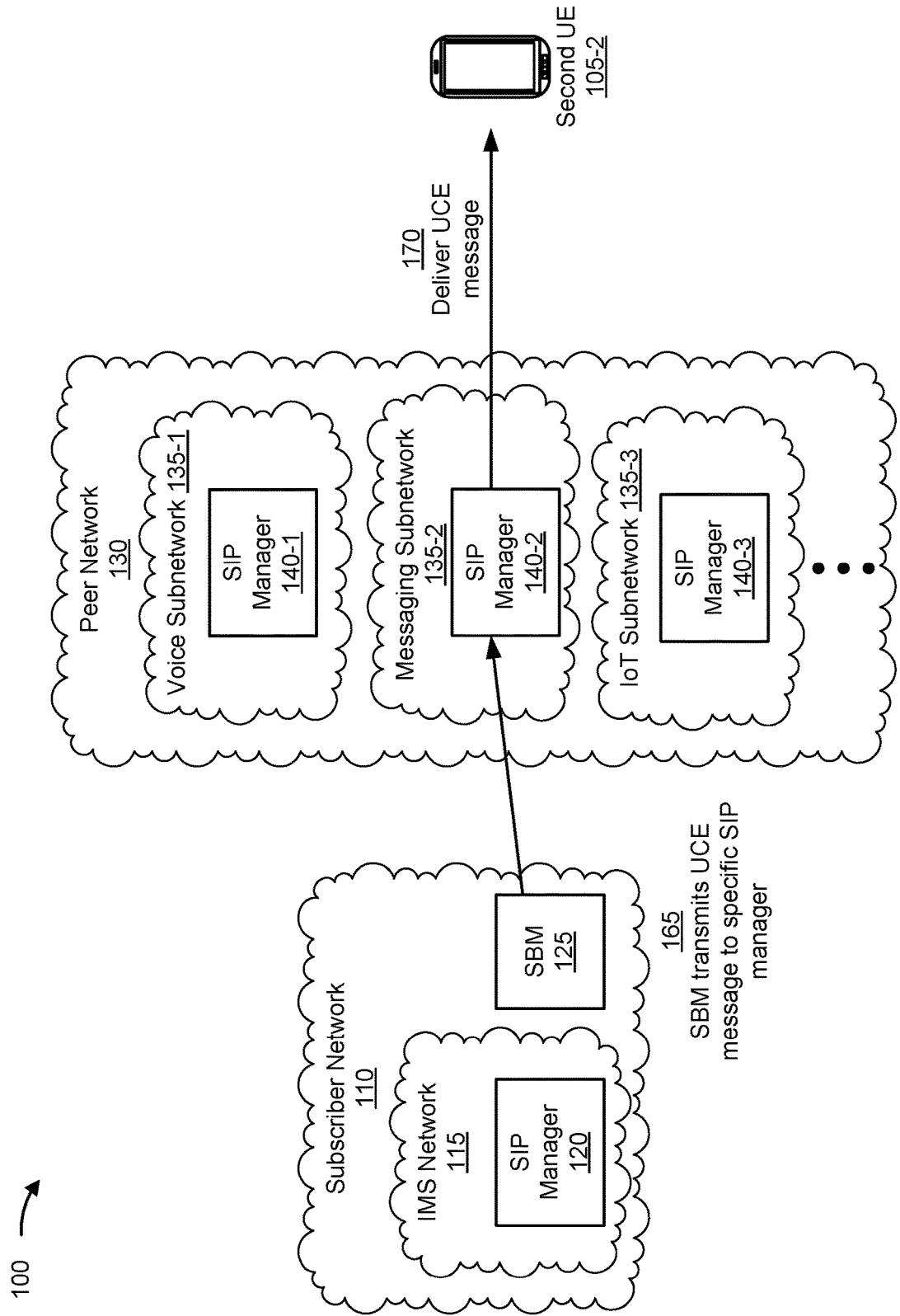

As shown in FIG. 1C, and by reference number 165, the SBM 125 may transmit the UCE message to a specific (e.g., a single) IMS subnetwork 135 and/or SIP manager 140 included in the peer network 130. For example, the SBM 125 may transmit the UCE message to a SIP manager 140 based on identifying a network address of the SIP manager 140 using the ENUM data structure, as described above. The specific IMS subnetwork 135 and/or the specific SIP manager 140 may be associated with managing communication sessions associated with the service type indicated in the UCE message. In example 100, where the service type is a messaging service type, the SBM 125 identifies a device included in the messaging subnetwork 135-2 (e.g., the SIP manager 140-2, a gateway associated with the messaging subnetwork 135-2, an interconnection border control function (IBCF) gateway associated with the messaging subnetwork 135-2, and/or the like). When the SBM 125 transmits the UCE message to this device, the SIP manager 140-2 may receive the UCE message.

Notably, the SBM 125 does not transmit the UCE message (e.g., refrains from transmitting the UCE message or prevents the UCE message from being transmitted) to all IMS subnetworks 135 of the peer network 130. For example, the SBM 125 may prevent the UCE message from being transmitted to one or more IMS subnetworks 135 that are not associated with the service type. In this case, the SBM 125 may transmit the UCE message to a first IMS subnetwork 135 of the peer network 130 (e.g., that is designated to manage communication sessions associated with the service type) without transmitting the UCE message to a second IMS subnetwork 135 of the peer network 130 (e.g., that is not designated to manage communication sessions associated with the service type). In this way, resources of the SBM 125 and devices of the second IMS subnetwork 135 (e.g., memory resources, processing resources, and/or the like) may be conserved. Furthermore, network resources may be conserved due to transmission of fewer messages.

As shown by reference number 170, the SIP manager 140 that receives the UCE message (e.g., SIP manager 140-2 in example 100) may process the UCE message and cause the UCE message to be delivered to the second UE 105-2 (e.g., via the peer network 130 and/or a base station) as part of a session initiation procedure.

Figure 1D:
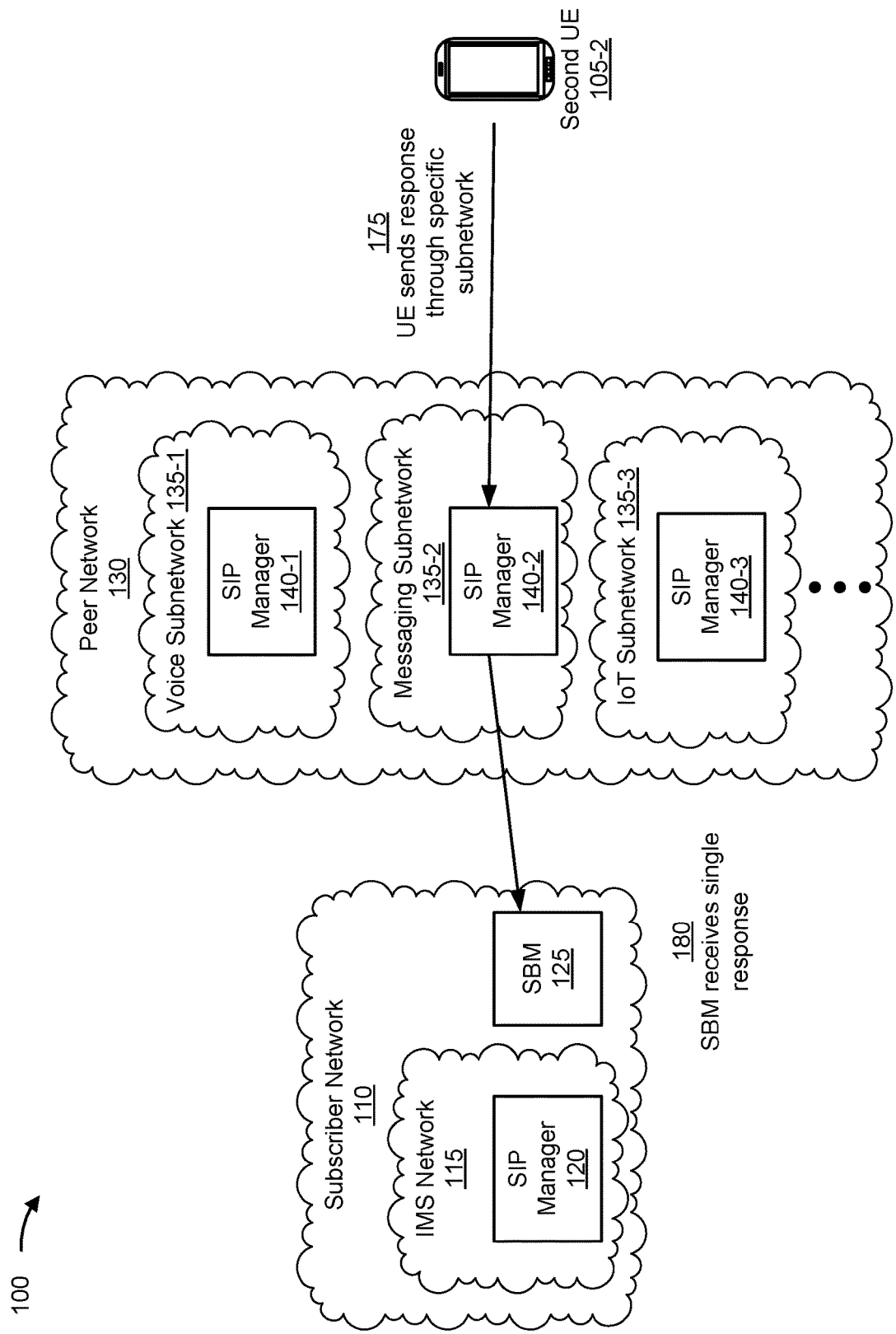

As shown in FIG. 1D, and by reference number 175, the second UE 105-2 may respond to the UCE message. For example, the second UE 105-2 may indicate its capabilities in the UCE message, which may include a UCE response, such as a SIP response message, a SIP notify message, a SIP options response message, and/or the like. In some implementations, the UCE response may be routed through a single IMS subnetwork 135 (or fewer than all IMS subnetworks 135) of the peer network 130, shown as the messaging subnetwork 135-2 in FIG. 1D. This conserves resources of the second UE 105-2 that would otherwise be used to process and/or respond to multiple UCE messages (e.g., from multiple IMS subnetworks 135). This also conserves network resources that would otherwise be used to transmit multiple UCE responses.

As shown by reference number 180, the SBM 125 may receive a single UCE response from a single IMS subnetwork 135 (e.g., the messaging subnetwork 135-2 in example 100) and/or fewer than all of the IMS subnetworks 135. This conserves resources of the SBM 125 that would otherwise be used to receive and/or process multiple UCE messages (e.g., from multiple IMS subnetworks 135). This also conserves network resources that would otherwise be used to transmit multiple UCE responses. In some implementations, the UCE response may indicate the service type, in a similar manner as described above in connection with the UCE message.

Figure 1E:
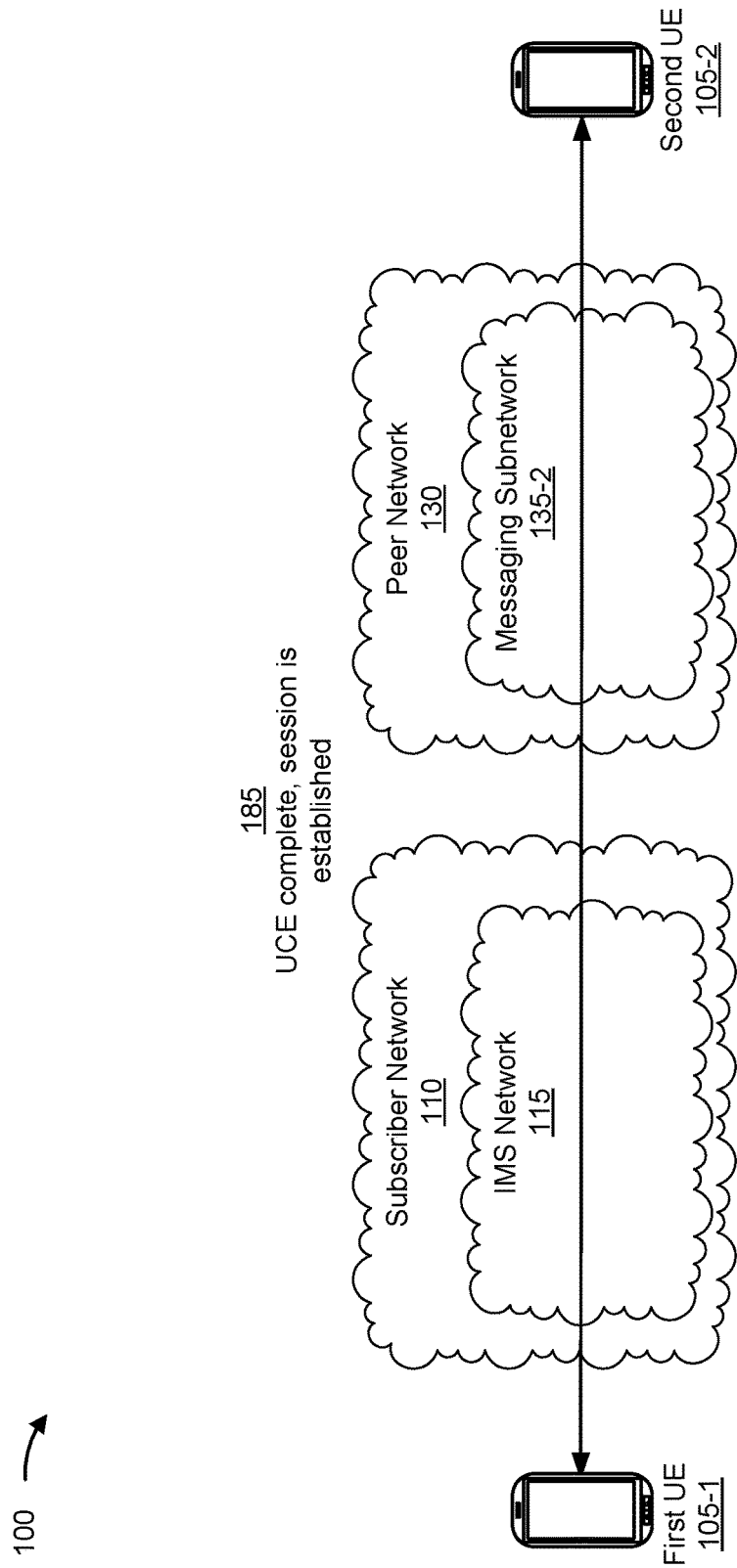

As shown in FIG. 1E, and by reference number 185, based on the operations described above, the user capability exchange may be completed and a session (e.g., a SIP session) between the first UE 105-1 and the second UE 105-2 may be established based on the user capability exchange. By processing and/or transferring UCE messages as described above, network resources and resources of multiple devices (e.g., the SBM 125, one or more devices of peer network 130, one or more devices of one or more IMS subnetworks 135, one or more SIP managers 140, the second UE 105-2, and/or the like) may be conserved, as described elsewhere herein.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
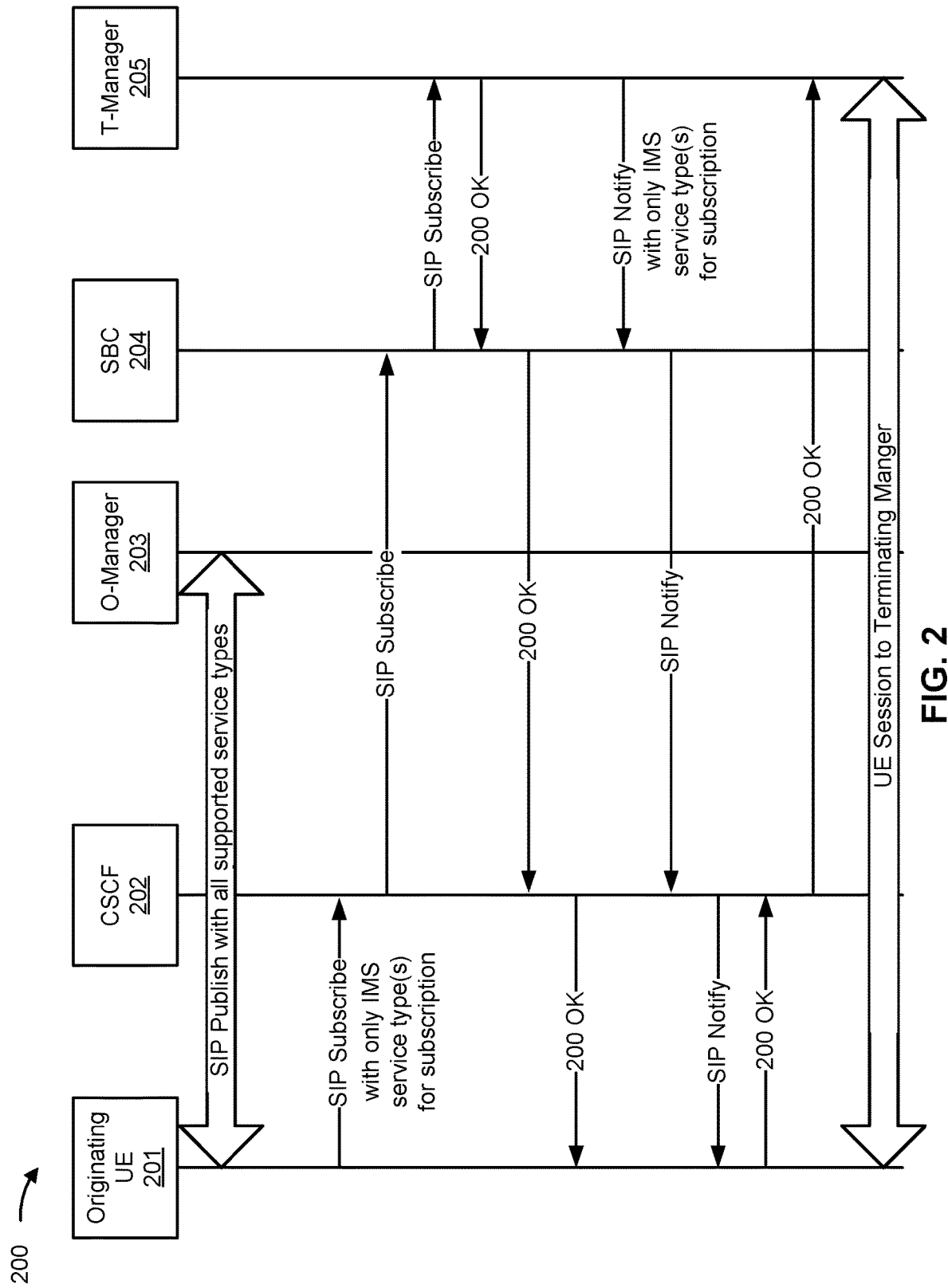
FIG. 2 is a diagram of an example call flow associated with user capability exchange across networks.

FIG. 2 is a diagram of an example call flow 200 associated with user capability exchange across networks. Example call flow 200 is an example of a call flow for a presence-based user capability exchange. As shown in FIG. 2, communications may be transferred among an originating UE 201, a call session control function (CSCF) device 202, an originating manager 203 (shown as O-Manager), an SBC 204, and a terminating manager 205 (shown as T-Manager).

The originating UE 201 may be the first UE 105-1. In some implementations, the CSCF 202 and the originating manager 203 are implemented in the SIP manager 120 (e.g., in the subscriber network 110). The CSCF 202 may include a proxy CSCF (P-CSCF) (e.g., a SIP proxy) and/or a serving CSCF (S-CSCF). The originating manager 203 may include a presence server for the subscriber network 110. The SBC 204 may implemented in the SBM 125, which may be in the subscriber network 110 and/or the peer network 130. In some implementations, the terminating manager 205 may be implemented in a SIP manager 140 of an IMS subnetwork 135 of the peer network 130. The terminating manager 205 may include a presence server for the peer network 130. A presence server (sometimes referred to as a presence agent, a SIP presence server, a SIP presence agent, and/or the like) may receive and store information about UEs, and may transmit notifications to subscribed UEs when a presence state changes for a UE.

As shown in FIG. 2, the originating UE 201 and the originating manager 203 may communicate to establish SIP registration information for the originating UE 201. For example, the originating UE 201 may transmit a SIP publish message to the CSCF 202, and the CSCF 202 may transmit the SIP publish message to the originating manager 203. The SIP publish message may indicate all service types and/or IMS features supported by the originating UE 201. The originating manager 203 may store this message, and may transmit a SIP 200 OK message (e.g., an acknowledgement message) to the originating UE 201 via the CSCF 202.

As further shown in FIG. 2, the originating UE 201 may transmit a SIP subscribe message to subscribe to event notifications. As shown, the SIP subscribe message may indicate a service type, as described elsewhere herein. For example, the SIP subscribe message may indicate a service type for which the originating UE 201 is to subscribe to receive event notifications (e.g., event notifications associated with that service type). As shown, the CSCF 202 may receive the SIP subscribe message and may transmit the SIP subscribe message to the terminating manager 205 via the SBC 204. The SBC 204 may process the SIP subscribe message based on the service type, and may route the SIP subscribe message to the appropriate terminating manager 205 according to the service type, as described above in connection with FIGS. 1A-1E. The terminating manager 205 may store an indication of the subscription associated with the originating UE 201, and may transmit an acknowledgement message (e.g., a SIP 200 OK message) to the originating UE 201 via the SBC 204 and/or the CSCF 202.

As further shown, when an event to which the originating UE 201 is subscribed changes, the terminating manager 205 may transmit a SIP notify message to the originating UE 201 (e.g., via the SBC 204 and/or the CSCF 202). As shown, the SIP notify message may indicate a service type, as described elsewhere herein. For example, the SIP notify message may indicate a service type to which the originating UE 201 previously subscribed (e.g., event notifications associated with that service type). The SIP notify message may be transmitted via only a single terminating manager 205 associated with a single IMS subnetwork associated with the service type, as described above in connection with FIGS. 1A-1E.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
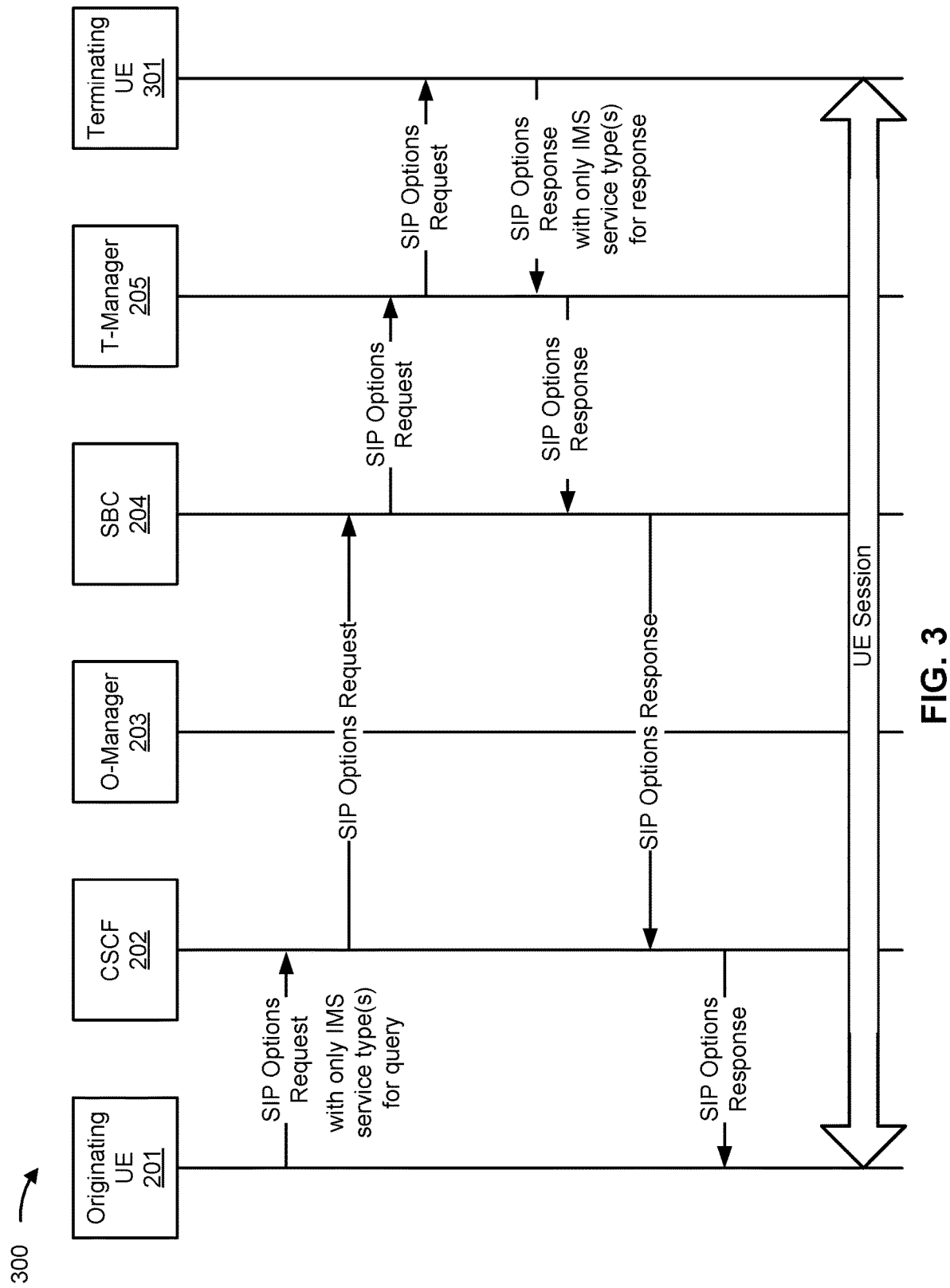
FIG. 3 is a diagram of another example call flow associated with user capability exchange across networks.

FIG. 3 is a diagram of an example call flow 300 associated with user capability exchange across networks. Example call flow 300 is an example of a call flow for a SIP options-based user capability exchange. As shown in FIG. 3, communications may be transferred among an originating UE 201, a CSCF device 202, an originating manager 203 (shown as O-Manager), an SBC 204, a terminating manager 205 (shown as T-Manager), and a terminating UE 301. The originating UE 201, CSCF device 202, originating manager 203, SBC 204, and terminating manager 205 are described above in connection with FIG. 2. The terminating UE 301 may be the second UE 105-2.

As shown in FIG. 3, the originating UE 201 may transmit a SIP options request message to query the terminating UE 301 (or a terminating server or another terminating device) regarding the capabilities of the terminating UE 301. As shown, the SIP options request message may indicate a service type, as described elsewhere herein. For example, the SIP options request message may indicate a service type associated with the query by the originating UE 201. As shown, the CSCF 202 may receive the SIP options request message and may transmit the SIP options request message to the SBC 204 (e.g., via the originating manager 203, in some implementations). The SBC 204 may process the SIP options request message based on the service type, and may route the SIP options request message to the appropriate terminating manager 205 according to the service type, as described above in connection with FIGS. 1A-1E. The terminating manager 205 may route the SIP options request message to the terminating UE 301.

As shown in FIG. 3, the terminating UE 301 may respond to the SIP options request message by transmitting a SIP options response message that indicates the capabilities of the terminating UE 301. As shown, the SIP options response message may indicate a service type, as described elsewhere herein. For example, the SIP options response message may indicate a service type associated with the query by the originating UE 201. The SIP options response message may be transmitted via the terminating manager 205, the SBC 204, and/or the CSCF 202. The SIP options response message may be transmitted via only a single terminating manager 205 associated with a single IMS subnetwork associated with the service type, as described above in connection with FIGS. 1A-1E.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
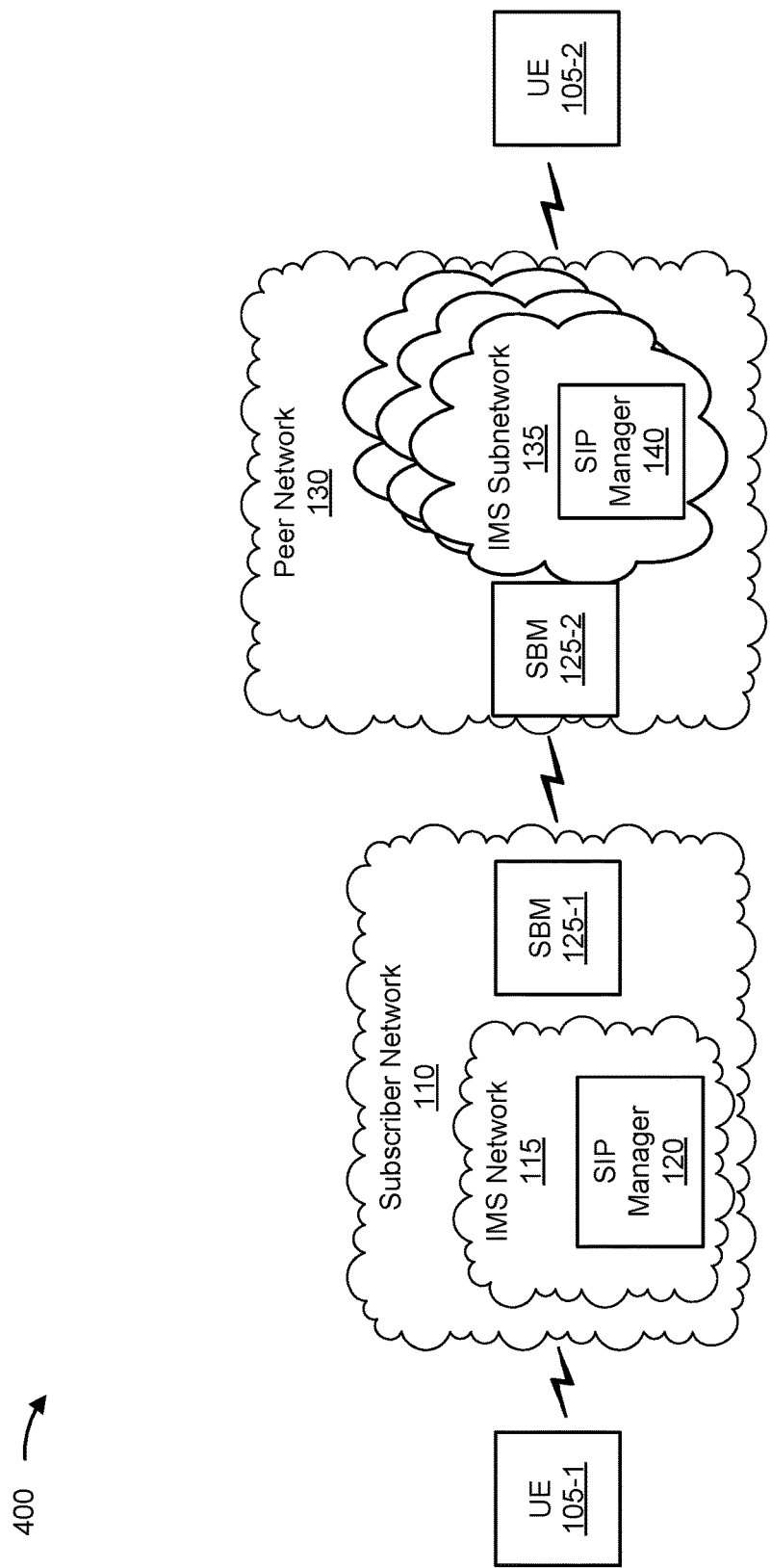
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include one or more UEs 105 (shown as a first UE 105-1 and a second UE 105-2), a subscriber network 110, an IMS network 115, a SIP manager 120, one or more SBMs 125, a peer network 130, multiple IMS subnetworks 135 with corresponding SIP managers 140, and/or the like. Devices of environment 400 may interconnect via wired connections, wireless connections, or a combination of wired and wireless connections.

The UE 105 (e.g., an originating UE and/or a terminating UE, as described elsewhere herein) includes one or more devices capable of receiving, generating, storing, processing, and/or providing SIP messages, as described elsewhere herein. The UE 105 may include a communication device and/or a computing device. For example, the UE 105 may include a SIP user agent, a wireless communication device, a wired communication device, a user device, a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, a server, or a similar type of device. The UE 105 may communicate with one or more other devices of environment 400, as described elsewhere herein. Although some examples are described herein in connection with the UE 105 being a mobile device, in some aspects, the UE 105 may be a server or another wired communication device.

The subscriber network 110 includes a core network of a first MNO with which a first UE 105-1 has a subscription. For example, the subscriber network 110 may include a home network of the first UE 105-1. As shown, the subscriber network 110 includes a single IMS network (or subnetwork) 115. The single IMS network 115 may handle all SIP traffic and/or IMS traffic for the subscriber network 110. The SIP manager 120 includes one or more devices that manage SIP traffic and/or IMS traffic for the IMS network 115, such as the CSCF device 202, the originating manager 203, and/or the like. In some implementations, the subscriber network 110 includes a radio access network for communicating with the first UE 105-1.

The SBM 125 includes one or more devices capable of receiving, generating, storing, processing, providing, and/or routing traffic between core networks of different MNOs. For example, the SBM 125 may include a gateway, a router, a switch, and/or a similar type of device. In some implementations, the SBM 125 may implement a border gateway protocol (BGP) or another protocol used for traffic transfer between networks. In some implementations, the SBM 125 may include an SBC and an ENUM data structure, as described elsewhere herein. In some implementations, the subscriber network 110 may include an SBM 125, shown as a first SBM 125-1. Additionally, or alternatively, the peer network 130 may include an SBM 125, shown as a second SBM 125-2. Either or both of these SBMs 125 may perform the operations described herein.

The peer network 130 includes a core network of a second MNO (e.g., different from the first MNO). In some implementations, the first UE 105-1 may not have a subscription with the second MNO. Additionally, or alternatively, a second UE 105-2 may have a subscription with the second MNO (e.g., and not with the first MNO). For example, the peer network 130 may include a home network of the second UE 105-2. As shown, the peer network 130 includes multiple IMS subnetworks 135. Each IMS subnetwork 135 may handle a different subset of SIP traffic and/or IMS traffic for the peer network 130. For example, different IMS subnetworks 135 may handle traffic associated with different SIP service types. In some implementations, each IMS subnetwork 135 includes a corresponding SIP manager 140. The SIP manager 140 includes one or more devices that manage SIP traffic and/or IMS traffic for a corresponding IMS subnetwork 135, such as a CSCF device, the terminating manager 205, and/or the like. In some implementations, the peer network 130 includes a radio access network for communicating with the second UE 105-2.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
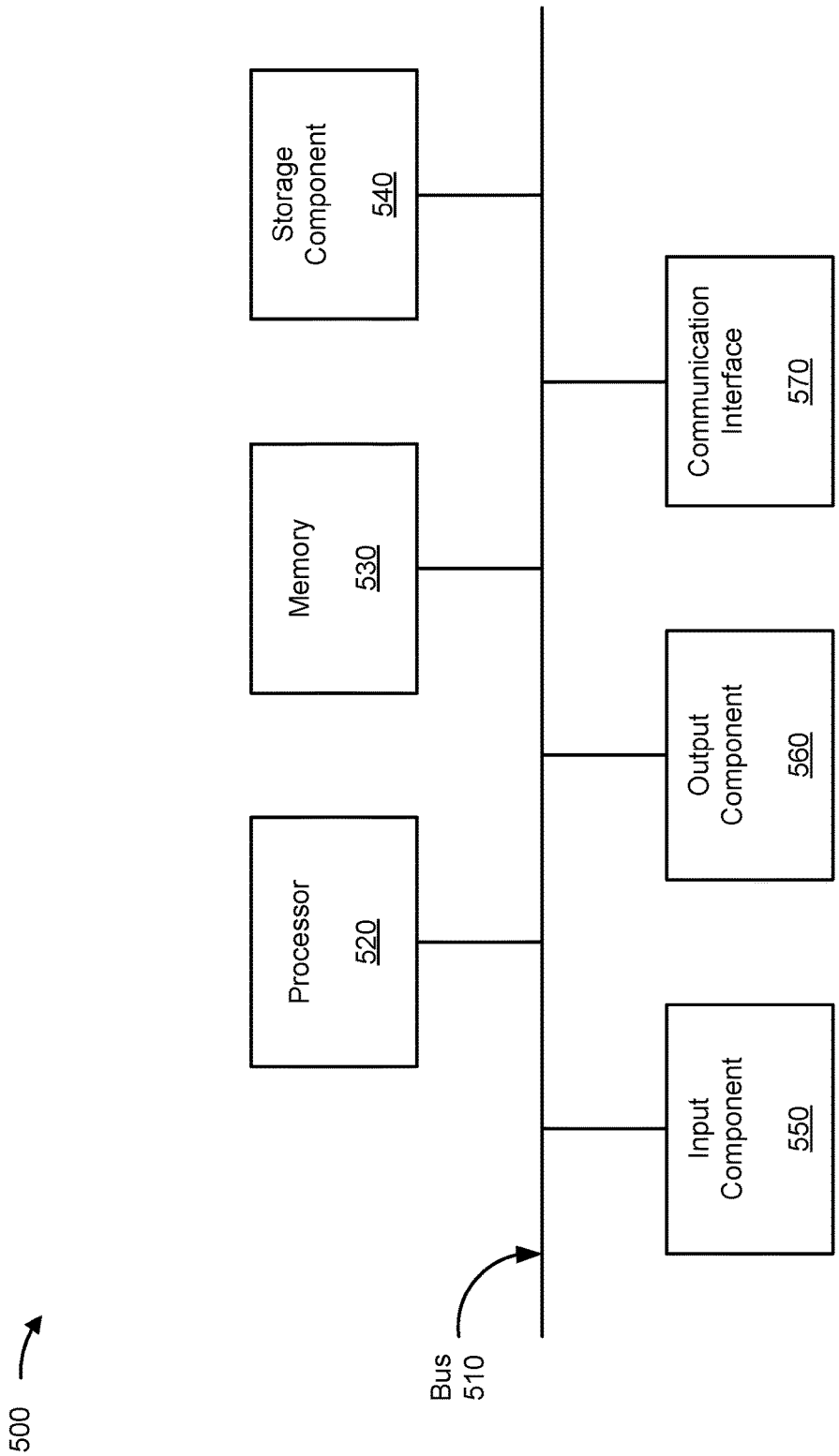
FIG. 5 is a diagram of example components of one or more devices of FIG. 2.

FIG. 5 is a diagram of example components of a device 500. Device 500 may correspond to the UE 105, the SIP manager 120, the SBM 125, and/or the SIP manager 140. In some implementations, the UE 105, the SIP manager 120, the SBM 125, and/or the SIP manager 140 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
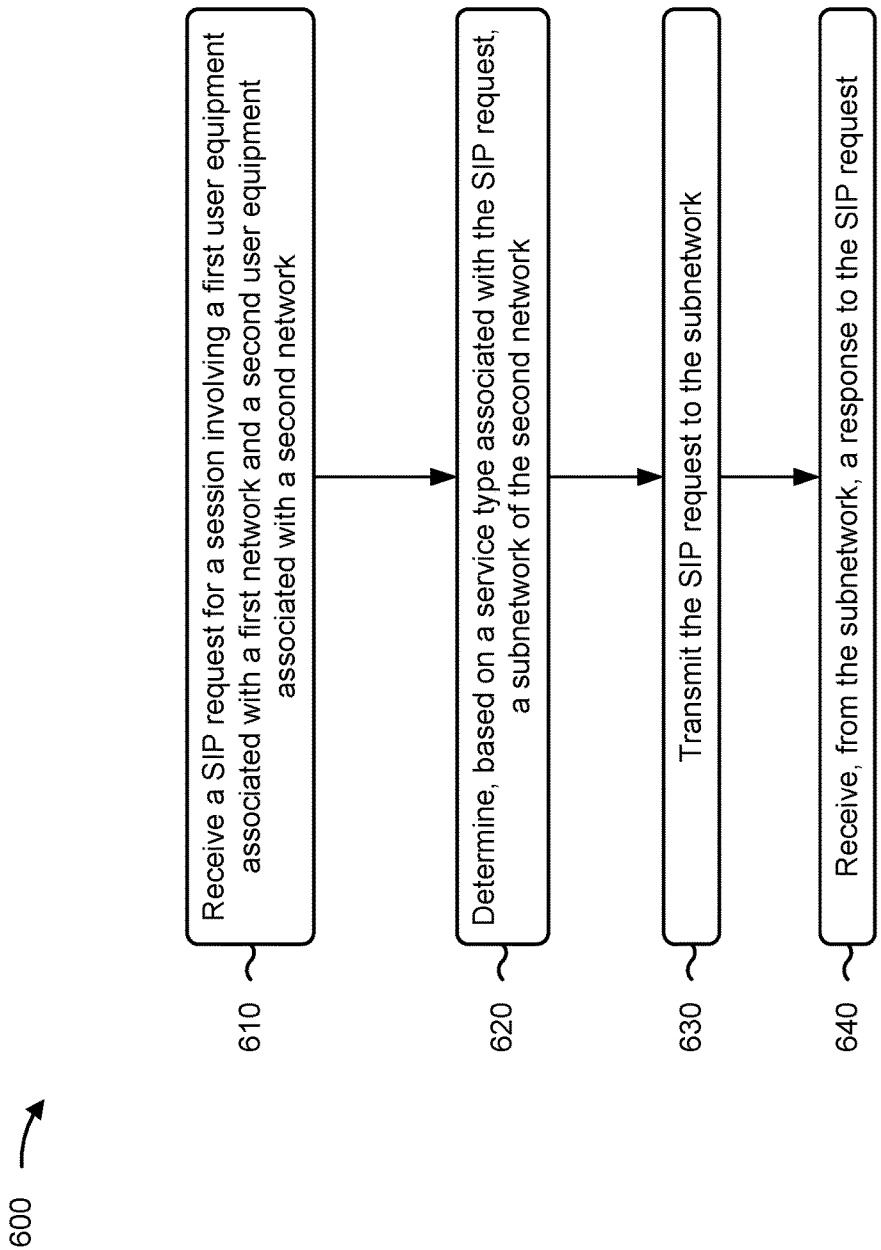
FIG. 6 is a flow chart of an example process relating to user capability exchange across networks.

FIG. 6 is a flow chart of an example process 600 associated with a user capability exchange across networks. In some implementations, one or more process blocks of FIG. 6 may be performed by an SBM (e.g., SBM 125, an SBC of the SBM 125, and/or the like). In some implementations, one or more process blocks of FIG. 6 may be performed by another device or a group of devices separate from or including the device, such as a SIP manager (e.g., SIP manager 120, SIP manager 140, and/or the like). Additionally, or alternatively, one or more process blocks of FIG. 6 may be performed by one or more components of a device 500, such as processor 520, memory 530, storage component 540, input component 550, output component 560, communication interface 570, and/or the like.

As shown in FIG. 6, process 600 may include receiving a SIP request for a session involving a first user equipment associated with a first network and a second user equipment associated with a second network (block 610). For example, the SBM may receive a SIP request for a session involving a first user equipment and a second user equipment, as described above. In some implementations, the first user equipment is subscribed to a first network (e.g., associated with a first MNO), and the second user equipment is subscribed to a second network (e.g., associated with a second MNO). The SIP request may be associated with a user capability exchange for a SIP session between the first user equipment and the second user equipment. In some implementations, the SIP request indicates a service type of the session.

As further shown in FIG. 6, process 600 may include determining, based on a service type associated with the SIP request, a subnetwork of the second network (block 620). For example, the SBM may determine, based on the service type, a subnetwork of the second network that is to facilitate the session, as described above. In some implementations, the subnetwork is one subnetwork, of a plurality of subnetworks, of the second network that is designated to manage communications that are associated with the service type. In some implementations, the first network includes a single IMS core, the plurality of subnetworks correspond to a plurality of separate IMS cores, and the service type corresponds to an IMS service that is managed by the subnetwork. To determine the subnetwork, the SBM may extract, from a header of the SIP request, a service type identifier from a header of the SIP request, and may obtain an address of the subnetwork based on the service type identifier.

As further shown in FIG. 6, process 600 may include transmitting the SIP request to the subnetwork (block 630). For example, the SBM may transmit the SIP request to the subnetwork to cause the subnetwork to initiate the session with the second user equipment, as described above. In some implementations, the SBM may prevent the SIP request from being transmitted to another subnetwork, of the plurality of subnetworks, that is not designated to manage the communications that are associated with the service type.

As further shown in FIG. 6, process 600 may include receiving, from the subnetwork, a response to the SIP request (block 640). For example, the SBM may receive, from the subnetwork, a response to the SIP request, as described above. In some implementations, the response identifies the service type. In some implementations, the SBM may cause, based on the response, a session to be established between the first user equipment and the second user equipment.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first network device, a session initiation protocol (SIP) request for a session involving a first user equipment subscribed to a first network and a second user equipment subscribed to a second network that is different than the first network,
      wherein the first user equipment does not have a subscription with the second network,
      wherein the first network and the second network are managed by different mobile network operators,
      wherein the second network includes a plurality of subnetworks and a plurality of second network devices corresponding to the plurality of subnetworks,
      wherein the SIP request is received via a single Internet protocol multimedia subsystem (IMS) of the first network,
      wherein the SIP request indicates a service type, of a plurality of service types, of a specific service for the session that includes at least an IMS service managed by a particular second network device, of the plurality of second network devices, and corresponding to a particular subnetwork of the plurality of subnetworks, and
      wherein each of the plurality of second network devices manages communication for a different one of the plurality of service types;
   determining, by the first network device and based on mapping of the service type, that the particular second network device is to facilitate the session involving the specific service,
      wherein the mapping includes information associating the particular subnetwork with information associated with a corresponding set of service types, including the service type, handled by the particular subnetwork, and includes an address associated with the particular second network device;
   transmitting, by the first network device, the SIP request to the particular second network device to cause the particular second network device to initiate the session with the second user equipment,
   preventing, by the first network device and based on the service type, the SIP request from being transmitted by the first network device to another second network device, of the plurality of second network devices, that is not designated to manage communication that is associated with the service type;
   receiving, by the first network device and from the particular second network device, a response to the SIP request; and
   causing, by the first network device and based on the response, the session to be established between the first user equipment and the second user equipment.

2. The method of claim 1, wherein the SIP request is associated with a user capability exchange for the session.

3. The method of claim 1, wherein determining the particular second network device comprises:
   extracting, from a header of the SIP request, a service type identifier that identifies the service type;

obtaining, from a data structure, an address of the particular second network device,
    wherein the service type identifier is mapped to the address in the data structure; and
transmitting, based on the address, the SIP request to the particular second network device.

4. A device, comprising:
one or more processors configured to:
    receive a session initiation protocol (SIP) request for a specific service involving a first user equipment that is subscribed to a first network and a second user equipment that is subscribed to a second network different from the first network,
        wherein the first user equipment does not have a subscription with the second network,
        wherein the first network and the second network are managed by different mobile network operators,
        wherein the second network includes a plurality of subnetworks and a plurality of second network devices corresponding to the plurality of subnetworks,
        wherein the SIP request is received via a single Internet protocol multimedia subsystem (IMS) of the first network,
        wherein the SIP request indicates a service type, of a plurality of service types, for the specific service that includes at least an IMS service managed by a particular second network device, of the plurality of second network devices and corresponding to a particular subnetwork of the plurality of subnetworks, and
        wherein each of the plurality of second network devices manages communication for a different one of the plurality of service types; process the SIP request to identify the service type;
    determine, based on mapping of the service type, that the particular second network is to facilitate the specific service,
        wherein the mapping includes information associating the particular subnetwork with information associated with a corresponding set of service types, including the service type, handled by the particular subnetwork, and includes an address associated with the particular second network device;
    transmit the SIP request to the particular second network device to cause the particular second network device to initiate the specific service with the second user equipment; and
    prevent, based on the service type, the SIP request from being transmitted by the device to another second network device, of the plurality of second network devices, that is not designated to manage communication that is associated with the service type.

5. The device of claim 4, wherein the service type is a voice call service type, a messaging service type, an Internet of Things service type, a media service type, a virtual reality service type, or an augmented reality service type.

6. The device of claim 4, wherein the specific service is associated with an application that is installed on the first user equipment and the second user equipment, and
    wherein the service type is identified in the SIP request based on the application.

7. The device of claim 4, wherein the one or more processors, when processing the SIP request, are configured to:
    extract, from a header of the SIP request, a service type identifier that identifies the service type;
    obtain, from a data structure, an address of the particular second network device,
        wherein the service type identifier is mapped to the address in the data structure; and
    transmit, based on the address, the SIP request to the particular second network device.

8. The device of claim 4, wherein the one or more processors, when transmitting the SIP request to the particular second network device, are configured to:
    transmit the SIP request to the particular second network device without transmitting the SIP request to another second network device of the plurality of second network devices.

9. The device of claim 4, wherein the SIP request is configured by the first user equipment based on an application that is executing on the first user equipment and that initiates the SIP request.

10. The device of claim 4, wherein the device is a session border controller of the second network and the SIP request is received from a session border controller of the first network, and
    wherein the device further comprises:
        a data structure that includes a mapping of the plurality of service types to the plurality of second network devices,
            wherein the particular second network device is identified based on the mapping.

11. A non-transitory computer-readable medium storing instructions, the instructions comprising:
    one or more instructions that, when executed by one or more processors, cause the one or more processors to:
        receive a session initiation protocol (SIP) request that is associated with a first user equipment subscribed to a first network and a second user equipment subscribed to a second network that is different from the first network,
            wherein the first user equipment does not have a subscription with the second network,
            wherein the first network and the second network are managed by different mobile network operators,
            wherein the second network includes a plurality of subnetworks and a plurality of second network devices corresponding to the plurality of subnetworks,
            wherein the SIP request is received via a single Internet protocol multimedia subsystem (IMS) of the first network,
            wherein the SIP request identifies a service type, of a plurality of service types, of a specific service for a session between the first user equipment and the second user equipment,
            wherein the service type corresponds to an IMS service that is managed by a particular second network device, of the plurality of second network devices and corresponding to a particular subnetwork of the plurality of subnetworks, and
            wherein each of the plurality of second network devices manages a communication for a different one of the plurality of service types;
        identify, based on mapping of the service type, the particular second network device that is to facilitate the specific service for the session,
            wherein the mapping includes information associating the particular subnetwork with information associated with a corresponding set of service types, including the service type, handled by the particular subnetwork, and includes an address associated with the particular second network device;

transmit the SIP request to the particular second network device to cause the particular second network device to initiate the session with the second user equipment; and prevent, based on the service type, the SIP request from being transmitted to another second network device, of the plurality of second network devices, that is not designated to manage communication that is associated with the service type.

12. The non-transitory computer-readable medium of claim 11, wherein the SIP request indicates the service type using at least one of a service type identifier, an application identifier, or a fully qualified domain name.

13. The non-transitory computer-readable medium of claim 11, wherein the SIP request comprises at least one of:
   a SIP subscribe request method for presence-based user capability exchange awareness, or
   a SIP options request method for options-based user capability exchange awareness.

14. The method of claim 1, wherein the first network device is a first session border controller of the second network and the SIP request is received from a second session border controller of the first network.

15. The method of claim 1, wherein the specific service is associated with an application that is installed on the first user equipment and the second user equipment, and
   wherein the service type is identified in the SIP request based on the application.

16. The method of claim 1, wherein the SIP request is configured by the first user equipment based on an application that is executing on the first user equipment and that initiates the SIP request.

17. The device of claim 4, wherein the SIP request includes a user capability exchange message.

18. The non-transitory computer-readable medium of claim 11,
   wherein the SIP request is received from a session border controller of the first network.

19. The non-transitory computer-readable medium of claim 11,
   wherein the specific service is associated with an application that is installed on the first user equipment and the second user equipment, and
   wherein the service type is identified in the SIP request based on the application.

20. The non-transitory computer readable medium of claim 11, wherein the SIP request is configured by the first user equipment based on an application that is executing on the first user equipment and that initiates the SIP request.

* * * * *